Oct. 24, 1944.  O. F. ARTHUR  2,361,165
VEHICLE TREAD
Filed Jan. 1, 1943  3 Sheets-Sheet 1
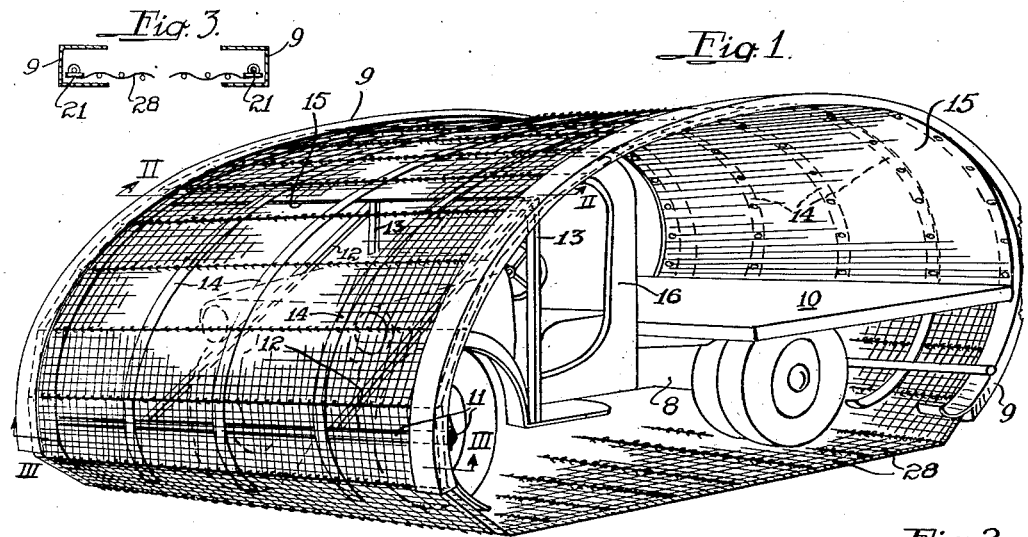
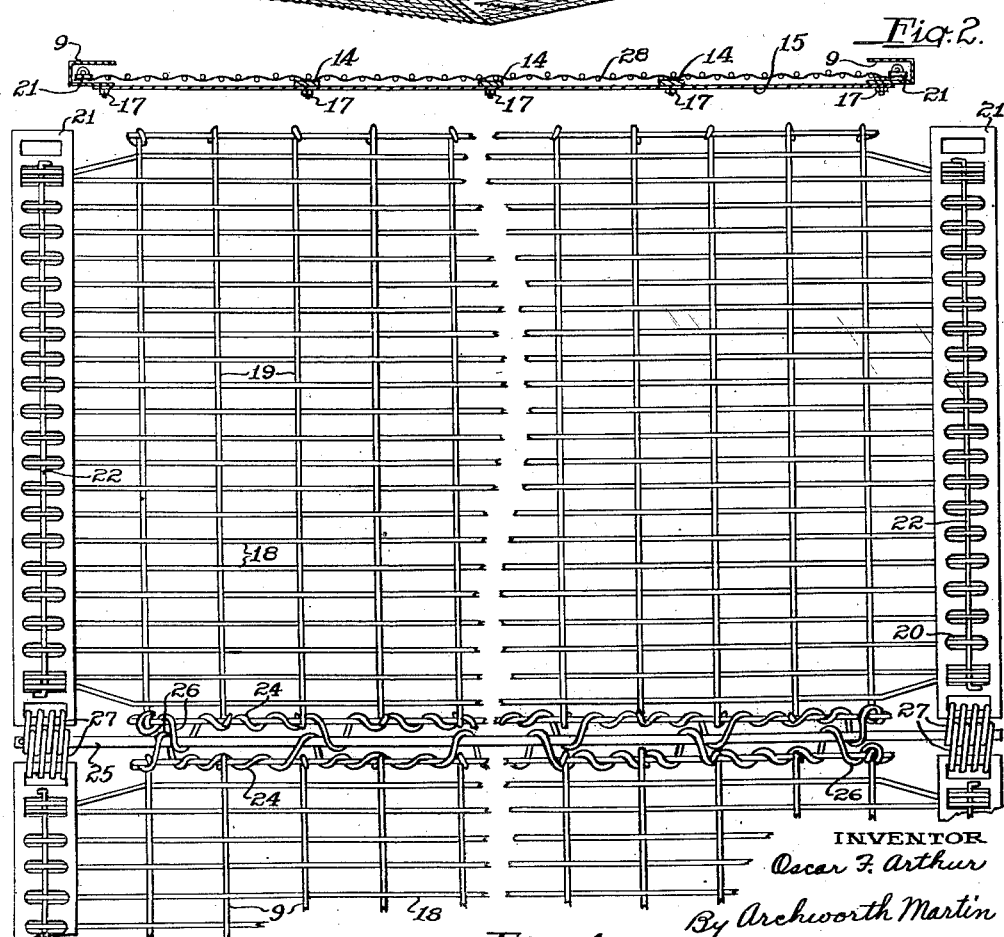
INVENTOR
Oscar F. Arthur
By Archworth Martin
His Attorney Oct. 24, 1944.  O. F. ARTHUR  2,361,165
VEHICLE TREAD
Filed Jan. 1, 1943   3 Sheets-Sheet 2

INVENTOR
Oscar F. Arthur
By Archworth Martin
His Attorney

Oct. 24, 1944.　　　O. F. ARTHUR　　　2,361,165
VEHICLE TREAD
Filed Jan. 1, 1943　　　3 Sheets-Sheet 3

INVENTOR
Oscar F. Arthur
By Archworth Martin
His Attorney

Patented Oct. 24, 1944

2,361,165

UNITED STATES PATENT OFFICE 2,361,165

VEHICLE TREAD

Oscar F. Arthur, Belle Vernon, Pa.

Application January 1, 1943, Serial No. 470,966

6 Claims. (Cl. 180—9)

My invention relates to vehicle treads, and more particularly to those of mat-like form, and has for one of its objects the provision of a tread device that can readily be applied to vehicles of various standard forms, for the purpose of enabling them to be driven over soft, swampy or sandy ground, or across ditches, or through snow.

Another object of my invention is to provide a tread device of the character referred to, which can be formed mainly of various known forms of wire mesh that is suitable also for other purposes.

Another object of my invention is to provide a tread device of the character referred to, which also will serve to protect a vehicle driver against bomb fragmentation and projectiles.

Still another object of my invention is to provide, with an open mesh tread device of the character referred to, means for freeing the mesh of dirt or snow that accumulates therein during traveling movement of the vehicle.

Figure 6:
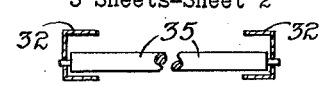
Figure 5:
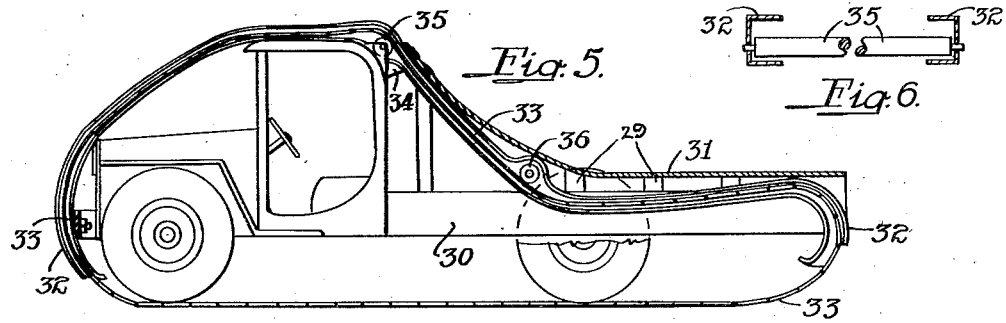
Figure 7:
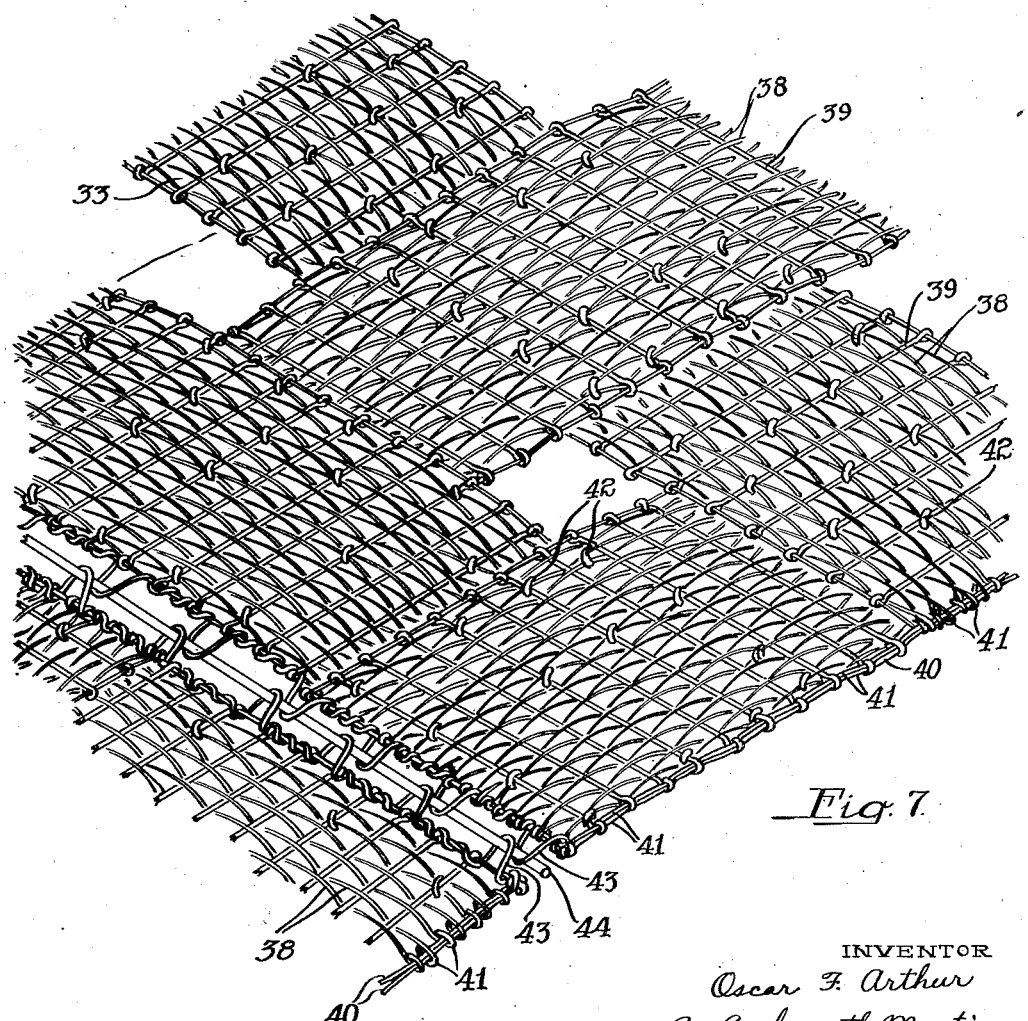
Figure 8:
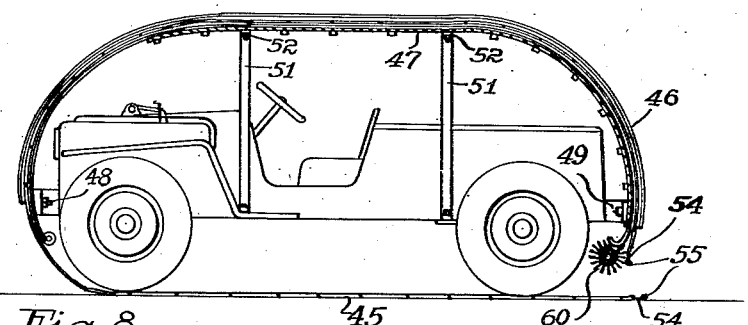
Figure 9:
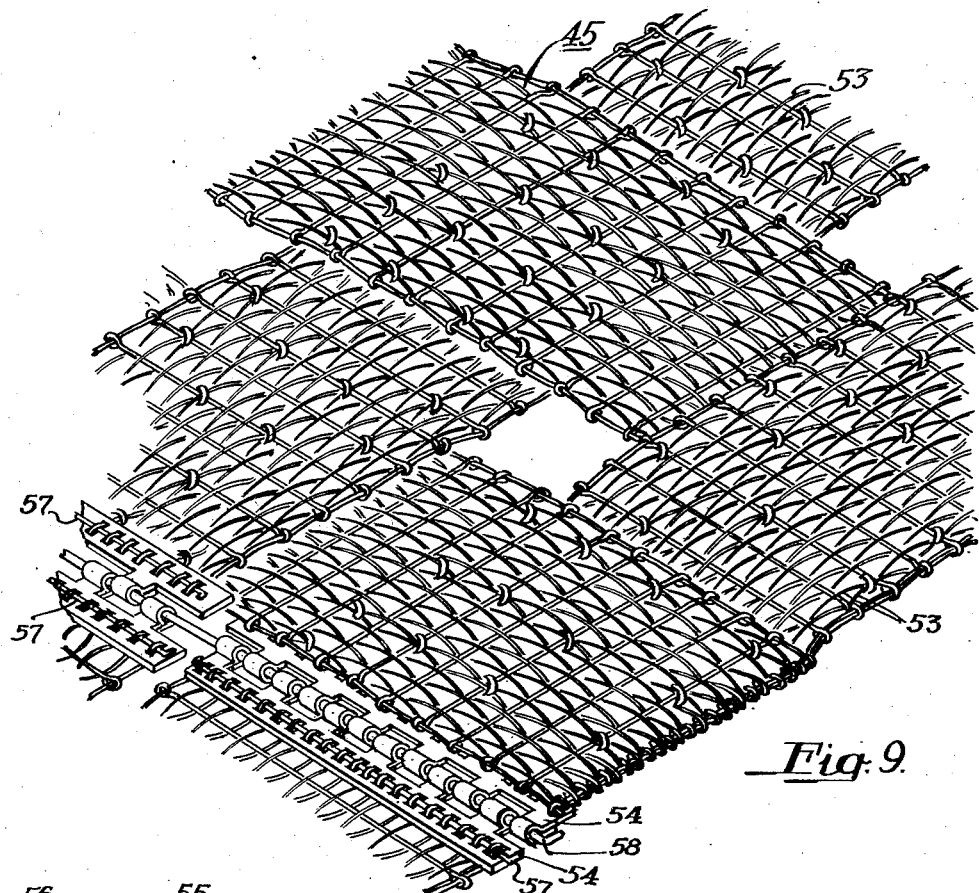
Figure 10:
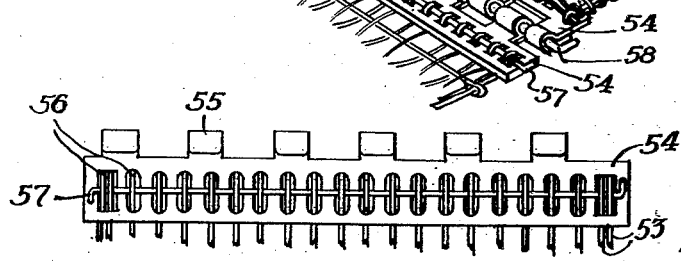

Some of the forms which my invention may take are shown in the accompanying drawings wherein Figure 1 is a perspective view showing a motor truck with my improved tread applied thereto; Fig. 2 is an enlarged view taken on the line II—II of Fig. 1; Fig. 3 is a fragmentary view taken on the line III—III of Fig. 1; Fig. 4 is a plan view on an enlarged scale, of a portion of the tread mesh of Fig. 1; Fig. 5 is a side view of a motor truck showing another manner in which the tread may be applied thereto; Fig. 6 is a view showing one of the anti-friction rollers of Fig. 5, with the guide channels associated therewith; Fig. 7 is a perspective view on an enlarged scale, of a portion of the tread mat of Fig. 5; Fig. 8 shows another modification of the invention, applied to another form of vehicle; Fig. 9 is a fragmentary perspective view of a modified form of mesh, on an enlarged scale, and Fig. 10 is an enlarged detail view of a portion of the structure of Fig. 9.

Referring first to Figs. 1 to 4, the device is shown as mounted upon a motor truck 8 of any well-known form. Guide rails 9 of channel form are suitably bolted at their rear ends to the truck bed 10 and at their forward ends are connected to a cross bar 11 which may be secured to the bumper bar of the vehicle. Brace bars 12 extend from the bumper to upright vehicle frame members 13 to stiffen and support the mat guides, although in many instances these members 12 may be dispensed with. Guide strips 14 are provided for supporting the mesh against sagging. A shield plate 15 extends from the rear edge of the vehicle bed 10 upwardly and forwardly to about the forward edge of the truck cab 16, so as to catch dirt which the tread devices hereinafter described carries with it when moving around the vehicle. The plate 15 is secured to the channels 9 and the guide rails 14 by bolts 17, the plate also serving to support the members 9 and 14 against relative displacement.

The mesh is shown as formed of mesh panels that are hingedly connected together to provide the required flexibility. The mesh may suitably be of somewhat the form shown in my patent application Ser. No. 437,989, filed April 7, 1942 (Patent 2,315,180), and the tread can be built up simply by using the mat panels of said application. Each panel comprises wire strands 18 and stay wires 19 that are interwoven with one another. These wires may conveniently be of hard drawn wire or spring steel, so that they will not easily become permanently bent in use or through handling, the wires being further resistant to such deformation because they can have slight sliding movement on one another. The ends of the stay wires 19 are snugly bent about the endmost wires 18. The wires 18, near their ends, have sharp bends 20 formed therein and project through holes in edge plates or bars 21. Retaining or lacing wires 22 are inserted beneath these bends in overlying relation to the bars 21, to hold the bars and the mesh in assembled relation.

The mesh portions of the panels are connected by spirally-twisted wires 24 and a hinge pin or rod 25. The wires 24 are of spiral form extending snugly around the adjacent wires 18, but have some of their bends drawn or extended to loop form as shown at 26. The rod 25 extends through these bends 26, thus forming a hinge joint. The rod 25 also serves as a pintle or hinge pin for connecting the ends of the bars 21, in that it extends through helically-wound coils 27 that extend through slots in the ends of the bars 21.

A sufficient number of these panels are connected together to form a mesh loop 28 of a length sufficient to extend around the vehicle and the guide rails as shown in Fig. 1, the marginal plates 21 lying within the channels 9, and the mesh overlying the guide rails 14.

As the vehicle is driven forward, the pressure of the front wheels of the vehicle will cause the upper portion of the mat to be drawn forwardly, that portion of the mat released by the rear wheels of the vehicle being merely pulled upwardly at the end of the vehicle, through the pull exerted by the front wheels. The tread or mat is of utility with either a four-wheel drive or a two-wheel drive, it being obvious that with a front wheel drive the mat will be more easily drawn through its annular path than where the vehicle has only a rear wheel drive. The mat fits loosely within the channels 9, the channels at the zones of sharpest curvature or shorter radius being somewhat wider, as shown in Fig. 3, to avoid binding of the edge plates 12 in the channels, at these zones of sharpest bend.

Notwithstanding the light weight of the tread or mat, it is effective to prevent miring of the vehicle in soft ground and sand, since it covers a wide area, and furthermore, it will enable vehicles to cross ditches which would otherwise be impassable. The mat further serves as an antiskid device and to prevent slipping of the wheels under tractive thrusts, since the mat itself will be forced into gripping engagement with a travelled surface or roadway and the vehicle wheels will not slip readily on the mesh wires.

By having the rails 9 and 14 curved to considerable distance above the truck bed 10, the truck can readily be utilized to transport persons and materials over terrain which would otherwise be impassable to automotive vehicles. The tread apparatus can readily be applied and removed, and when it is in place the loading of the vehicle can take place from the sides instead of loading it from the rear end.

Referring now to Figs. 5 to 7, I show another arrangement wherein not only a different form of mat is used, but it is arranged somewhat differently on a truck. In this instance, the mat may be formed somewhat as shown in my application Ser. No. 461,099, filed October 7, 1942, although the arrangement shown in Fig. 5 lends itself to mats of various other forms such as the chain link type. In this structure, the truck 30 may be of somewhat the usual form, but the mat extends across the upper surface of the bed or the body of the truck, and an auxiliary bottom 31 is provided that serves as a load-receiving surface for transporting persons or materials, and is supported by cross bars 29, on the channels 32. Guide channels 32 are provided for the edges of the mat 33, and suitable guide rails for the intermediate portions of the mat, as in the case of channels 9 and guide rails 14 of Fig. 1. The guide rails and channels are secured to the bumper 33 and to the rear end of the vehicle, suitable cross bars being provided at intervals as indicated at 34, to brace the guide rails and channels against lateral displacement. Antifriction rollers 35 and 36 are journalled in the channels 32 at suitable points, where the mat is subjected to bending on short radii.

While only two rollers are here shown, it will be understood that a sufficient number will be provided to reduce friction to a desired degree. As shown in Figs. 5 and 6, the channels are enlarged at the points where they carry the rollers.

As shown in the fragmentary perspective view of Fig. 7 which is on an enlarged scale relative to the showing in Fig. 5, the mat 33 is of the basket weave type. Each ribbon or strip of mat comprises strand wires 38 that pass over and under stay wires 39, in succession, in a manner similar to that in which the wires 18 and 19 are interwoven. At the longitudinal edges of the mat, only one of which is shown, selvage wires 40 are provided, there being either one or two selvage wires in each instance, as may be desired. The ends of the strands 38 of the crosswise strips of mesh are bent around these selvage wires as indicated at 41. Additionally, staples or wire loops 42 embracing the strands and stays of the transversely- and longitudinally-extending strips may be employed for firmly uniting the strips of mesh.

The transverse strips will extend the full width of the mesh and the longitudinally-extending strips will ordinarily extend the full length of the loop, although it can be divided transversely at various points. In any event, the ends of the longitudinally-extending strips will be connected in a suitable manner. For example, in Fig. 4 spirally-twisted wires having loops 43 formed therein are carried by the mat ends which are to be connected, and a connecting rod 44 passed through the loops, as in the case of Fig. 4, to provide a hinge joint.

The wires forming the mesh will be of spring steel or the like, and the mesh can therefore be subjected to repeated flexure in use and considerable bending weights and thrusts without becoming permanently distorted. It has been found in actual use that the mesh has sufficient flexibility to permit required turning of the truck wheels in steering and that the mesh loop will return to its normal contour after release from the stresses imposed thereon by turning movements of the truck or temporary distortions from other causes. By having the mesh loop of a width not less than that of the truck, it affords greater support to the truck in soft ground.

In Fig. 8 I show a mat or tread structure of the character referred to, as applied to a motor vehicle of the "jeep" type which is adapted to travel over rough and hilly terrain. In battle areas the vehicle can be driven to the front lines to remove wounded therefrom and to carry supplies thereto, the use of the mesh loop 45 permitting the vehicle to pass over soft or hilly ground which the vehicle could not otherwise traverse.

Guide channels 46 are provided for the edges of the mesh, as in Figs. 1 and 6, and also intermediate rails such as 14 of Figs. 1 and 2, with a shield plate 47, that corresponds to the shield plate 15. These elements are connected to the front and rear bumpers 48 and 49. Upright braces 51 are secured at their lower ends to the vehicle underframe at each side and at their tops to the channels 46, through cross bars 52. The uprights 51 give the strength which is required to support the channels against collapse and to withstand the weight of the vehicle should it capsize.

The mesh is of the same general form as that shown in Fig. 7, but in this instance the longitudinally-extending bands 53 of the mesh have hinge plates 54 connected thereto, each band 53 usually being of sufficient length to completely encircle the vehicle, although they can be made in shorter sections that are connected end-to-end, if desired, thus rendering them adaptable to vehicles of various lengths, and to permit replacement of damaged sections. The plates 54 are provided with knuckles 55. The longitudinally-extending strands of the bands 53 have bends 56 formed therein near their ends, these bends projecting through holes in the plates 54. Lacing rods or wires 57 are inserted between the bends and the plates to connect the plates to the bands. In order to complete the loop, the plates at the ends of the strip are brought together, with their respective knuckles in interspersed relation as in Fig. 9, to permit the insertion of a pintle or hinge pin 58 that may extend the full width of the mesh. The mesh may conveniently be applied to the vehicle by placing it flat upon the ground and driving the vehicle upon the rear portion thereof. The front portion of the mesh is then drawn rearwardly along the channels 46 to approximately the position shown in Fig. 8. Thereupon the plates 54 at the ends of the strip will be brought together to permit the insertion of the hinge rod 58 as in Fig. 9.

In order to remove dirt from the mesh, I provide a circular brush 60 that is rotatably supported by the lower ends of the channels 46. This brush has bristles that may suitably be of steel wire and whose outer ends will be projected through the mesh openings during travel of the vehicle, the brush being rotated by movement of the mesh and the bristles serving to push the dirt out of the mesh openings. The bristle wires are of sufficient resiliency to cause them to spring back to their original positions when they are bent through engagement with the plates 54 or other portions of the mesh structure.

The various mesh structures heretofore described have the further advantage of protecting the vehicle occupants from missiles such as bomb fragmentations and even direct hits from small calibre guns. For example, if the mesh is made of 8-gage steel or hard drawn wire, it will, in many instances, protect the vehicle occupants from the bullets of 50 calibre guns, when the bullets hit the mesh at angles other than in a perpendicular direction.

I claim as my invention:

1. The combination with a vehicle, of a tread device therefor comprising a flexible mat of transversely-extending mesh strips flexibly connected together at their edges and arranged in loop form, and means for supporting an upper portion of the mat loop upon the vehicle, the mat loop extending downwardly past the ends of the vehicle and beneath the same, and the mat being movable on its supporting means, whereby movement will be imparted to the mat about its axis during traveling movement of the vehicle.

2. The combination with a vehicle, of a tread device therefor comprising a flexible mat of transversely-extending mesh strips flexibly connected together at their edges and arranged in loop form, and means for supporting an upper portion of the mat loop upon the vehicle, the mat loop extending downwardly past the ends of the vehicle and beneath the same, and the mat being movable on its supporting means, whereby movement will be imparted to the mat about its axis during traveling movement of the vehicle, the flexible connections being in the form of hinged joints.

3. The combination with a vehicle, of a tread device therefor comprising a flexible mat of transversely-extending mesh strips flexibly connected together at their edges and arranged in loop form, and means for supporting an upper portion of the mat loop upon the vehicle, the mat loop extending downwardly past the ends of the vehicle and beneath the same, and the mat being movable on its supporting means, whereby movement will be imparted to the mat about its axis during traveling movement of the vehicle, the flexible connections being in the form of annular strips that cross and are connected to the transverse mesh strips.

4. The combination with a vehicle, of a tread device therefor comprising a flexible mat of transversely-extending mesh strips flexibly connected together at their edges and arranged in loop form adapted to encircle the vehicle from end to end thereof, and to engage the ground beneath the vehicle, and means in elevated position relative to the vehicle body for supporting the upper portion of the loop in an elevated path, the loop slidably engaging said supporting means.

5. The combination with a vehicle having a driver's seat and a load-carrying deck rearwardly thereof, of a tread device comprising a flexible mat of transversely-extending mesh strips flexibly connected together at their edges and arranged in loop form and of open mesh structure, and means for guiding the mat along a looped path that is vertically spaced at load-height above said deck and extends above said seat and to the ground, at the ends of the vehicle and along the ground beneath the vehicle, the mat being so supported that it will be moved along said path during traveling movement of the vehicle.

6. The combination with a vehicle having a driver's seat and a load-carrying deck rearwardly thereof, of a tread device comprising a flexible mat of transversely-extending mesh strips flexibly connected together at their edges and arranged in loop form and of open mesh structure, and means for guiding the mat along a looped path that extends beneath the said deck and above said seat, and to the ground, at the ends of the vehicle and along the ground beneath the vehicle, the mat being so supported that it will be moved along said path during traveling movement of the vehicle.

OSCAR F. ARTHUR.